United States Patent [19] | [11] 4,326,005

Reed et al. | [45] Apr. 20, 1982

[54] DRY RELEASE TRANSFER

[75] Inventors: Kenneth J. Reed, 33 Carlysle Square, London S.W.3; Alan L. Lythgoe, Hythe, both of England

[73] Assignee: Kenneth James Reed, London, England

[21] Appl. No.: 12,303

[22] Filed: Feb. 15, 1979

[30] Foreign Application Priority Data

Feb. 15, 1978 [GB] United Kingdom ................ 6068/78

[51] Int. Cl.$^{3}$ ........................... B32B 3/00; C09J 7/02

[52] U.S. Cl. ................................... 428/201; 427/146; 427/147; 428/202; 428/204; 428/207; 428/213; 428/336; 428/343; 428/352; 428/354; 428/913; 428/914; 430/253; 430/256; 430/281

[58] Field of Search ............... 428/195, 202, 914, 201, 428/204, 207, 213, 343, 352, 354, 913, 336; 427/146, 147; 430/256, 253, 281

[56] References Cited

U.S. PATENT DOCUMENTS

| | | | |
|---|---|---|---|
| 3,235,395 | 2/1966 | Scharf | 428/914 X |
| 3,834,925 | 9/1974 | Matsumura et al. | 428/914 X |
| 3,987,225 | 10/1976 | Reed et al. | 428/195 X |
| 4,041,204 | 8/1977 | Hepher et al. | 428/195 X |
| 4,044,181 | 8/1977 | Edhlund | 428/195 X |

FOREIGN PATENT DOCUMENTS

| | | |
|---|---|---|
| 959670 | 6/1964 | United Kingdom . |
| 1491678 | 1/1975 | United Kingdom . |
| 1521766 | 8/1978 | United Kingdom . |

OTHER PUBLICATIONS

English translation of Mecanorma French Patent No. 2,244,631, dated Sep. 1973.

*Primary Examiner*—Thomas J. Herbert, Jr.
*Attorney, Agent, or Firm*—William E. Jackson

[57] ABSTRACT

A dry release transfer is disclosed in which a releasable layer is adhered to a carrier sheet and a stress-resisting transferable design layer is printed on the releasable layer. The releasable layer is normally pre-stressed so that when an external force is applied to the carrier sheet , e.g. by rubbing with a stylus, this force is transmitted to the releasable layer. Since the releasable layer cannot yield to the applied force by stretching, because it is held by the stress-resisting layer, the adhesive bond between the releasable layer and the carrier sheet is weakened or is ruptured or partial or complete cohesive failure occurs within the releasable layer, thereby facilitating transfer of the design layer. A method of producing such transfers is also disclosed.

22 Claims, 6 Drawing Figures

DRY RELEASE TRANSFER

FIELD OF THE INVENTION

This invention relates to dry release transfers and to a method of producing such transfers.

DESCRIPTION OF THE PRIOR ART

Dry release transfers comprise a carrier sheet with one or more designs printed on one surface of the carrier sheet so that a selected design can be physically transferred as a dry ink layer to a receiving substrate and adhered thereto by an adhesive. Such transfers are termed "dry release" because the release of the designs from the carrier sheet does not require the application of a liquid.

Two types of dry transfers having different transfer mechanisms have been previously described in British Pat. Nos. 959,670 and 1,491,678 but several major problems exist with such dry transfers.

In general print quality is limited and is inadequate for important applications such as preparation of original artwork. Also, significant skill is necessary to achieve transfer of the design without breakage.

All the transfer mechanisms hitherto known do not give adequate control of transfer properties and frequently lead to failure to transfer or accidental or unwanted transfer. Furthermore the exclusive use of pressure sensitive adhesives in prior art dry transfers has restricted their field of use.

SUMMARY OF THE INVENTION

All of these manifold problems of prior art transfers are overcome in accordance with the invention by a dry release transfer comprising a carrier sheet and a releasable layer applied to the surface of this carrier sheet and a stress-resisting transferable design layer printed on said releasable layer whereby an external force applied to the carrier sheet is resisted by the transferable layer thereby stressing the releasable layer so as to cause one or more of cohesive or adhesive failure of the releasable layer, whereby the transferable layer is physically released from the carrier sheet together with at least a section of the releasable layer covered by the transferable layer around the edges of the transfer sheet.

In a further embodiment of the invention the releasable layer exists in a pre-stressed state prior to application of the external force. Such pre-stressed state can be produced by physical or chemical action of the transferable layer on the releasable layer during or after the formation of the transferable layer, or by thermal action or by a combination of any of these.

Such pre-stressing substantially reduces the level of the external force required to cause physical release of the transferable layer. Such transfer sheets can be prepared with accurately predetermined release characteristics including release by a small applied external force.

DETAILED DESCRIPTION OF THE INVENTION

The terms "releasable layer" and "release layer" are used interchangeably throughout this specification. However, it should be emphasised that the releasable or release layer which is a feature of the dry transfers of this invention are distinguished from the traditional release coatings used in this art, such as silicones and Werner type complexes, which have been applied to plastics carrier sheets in order to aid the release of designs printed thereon. Transfer sheets which consist of designs printed on a carrier sheet coated with said traditional release agents function in an entirely different manner in as much as the bond between the design and the release coating is very low so that the design is always released from the release coating while the latter remains in all cases on the carrier sheet. In contrast, the transfer mechanism of the transfer sheets of this invention involves stressing of the releasable layer which is prevented from yielding to the stressing force by stretching because of the stress-resisting design layer which overlays the releasable layer and is attached thereto. Consequently the stressing of the releasable layer leads to partial or complete cohesive failure of the releasable layer or weakening or rupture of the adhesive bond between the design and the carrier. In the former case, lateral shear occurs within the releasable layer, while in the latter case, the bond fails between the carrier and releasable layer. On transfer of the design at least a part of the releasable layer transfers with the design, usually a major part. In both cases, vertical shear normally occurs around the perimeter of the design so that a clean transfer takes place.

Transfer sheets can therefore be produced both with and without an adhesive layer and the transferable layer physically released and simultaneously or subsequently attached, respectively, to a receiving surface by any means including mechanical, magnetic, electrostatic or adhesive means. All types of adhesive may be used, including:

1. no-tack, low-tack and high tack pressure sensitive,
2. heat-fix, solvent-fix and water-fix,
3. liquid polymerising adhesives,
4. self-seal adhesives,
5. design layer adhesives,
6. adhesive receiving substrates,
7. delayed tack heat-fix adhesives,
8. encapsulated adhesives, The expression "transferable design layer" includes all those layers other than the releasable layers which are physically released as a single layer from the carrier sheet by the application of external force to the carrier sheet and includes a single colour design layer, multiple colour layer or clear layer, together with an adhesive layer, if present. Examples of single colour design layer plus adhesive layer are transfer sheets used for small designs such as sheets of letters or numerals. When the colour design is large or complex or is multicolour produced by halftone printing a clear or coloured layer is printed to extend over the whole of the colour design together so that these physically co-release together and can be transferred in one piece in their printed spatial relationship.

The term "design" includes all manner of pictures, decorations, pictorial games and toys, uniform colour areas, advertising markings and typographical characters such as alphabets of various lettering styles and sizes, numerals, symbols including electronic, architectural, chemical, engineering and mathematical symbols, various textures, titles, logos and text matter all of which may be single-coloured or multicoloured.

DESCRIPTION OF THE DRAWINGS

In the accompanying drawings,

Referring to FIG. 1 the transfer comprises a carrier sheet (1) coated with a release layer (2). The transferable design layer comprises half-tone colour dots (4) and a clear stress-resisting layer (3) of greater thickness. The region of the release layer (5) covered by the transferable design layer is broken to indicate pre-stressing of the release layer in this region by the transferable layer (3+4). Although in FIG. 1 (as well as in the other Figures) the release layer is shown as spaced from the carrier sheet and from the design layer, this is only for the purpose of clearly showing the individual layers. It will be appreciated that in fact these layers are in mutual contact.

Figure 1:
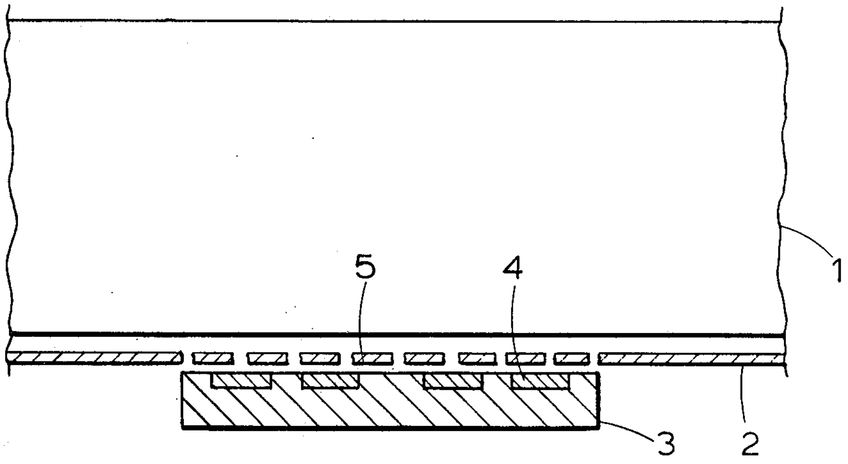
FIG. 1 illustrates in considerable magnification a cross-sectional schematic view of a transfer in accordance with the invention.
Figure 2:
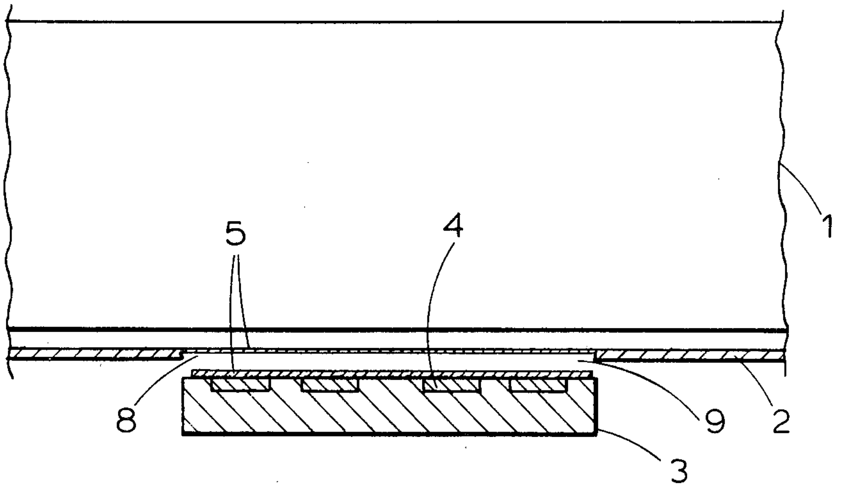
FIG. 2 is a view of the transfer of FIG. 1 after application of an external force to the upper surface of the carrier sheet (1). This stressing force has caused the release layer (5) to exhibit cohesive-failure (8) by lateral shear leaving a section of release layer on the carrier sheet and a section which has released with the transferable layer (3+4) and allows an air film (9) to enter so lightening the colour of the design (4) and giving a clear visual indication of physical release.
Figure 3:
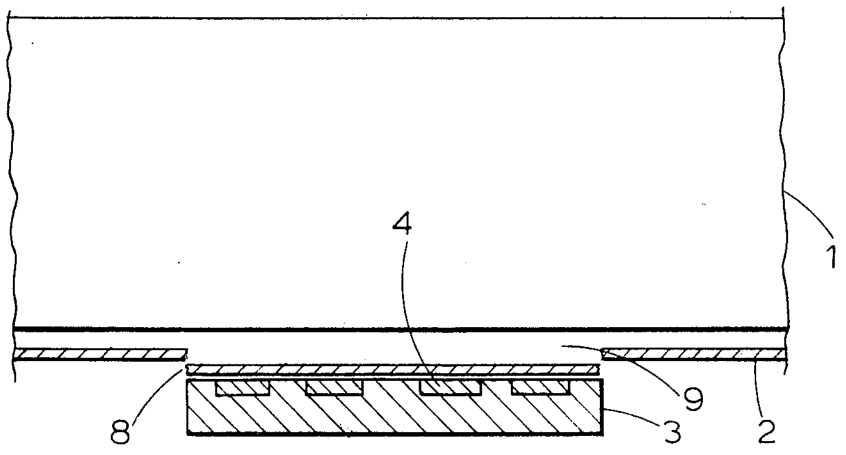
FIG. 3 illustrates a magnified cross-sectional view of a transfer similar to that shown in FIG. 1 in which release has occurred by adhesive failure so that the release layer (8) has all released with the transferable layer (3+4) and air has similarly entered (9) giving visual evidence of physical release.
Figure 4:
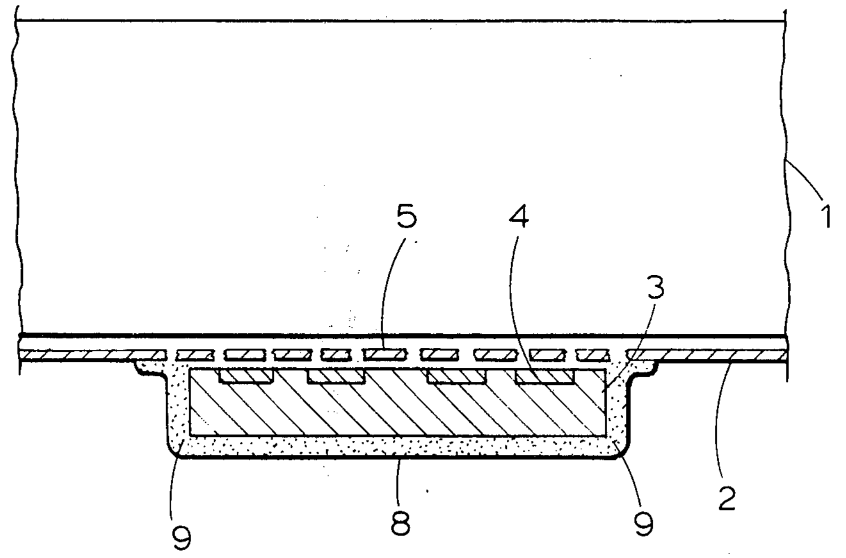
FIG. 4 illustrates in magnified cross-sectional view a transfer in accordance with the invention having a carrier sheet (1) coated with a release layer (2) and a superposed transferable layer (3 and 4). A region (5) of the release layer which has been prestressed by the overlapping transferable layer. A pressure sensitive adhesive layer (8) overlaps the transferable layer and is of a type which shears (9) around the edges of the transferable layer when the latter is physically released.
Figure 5:
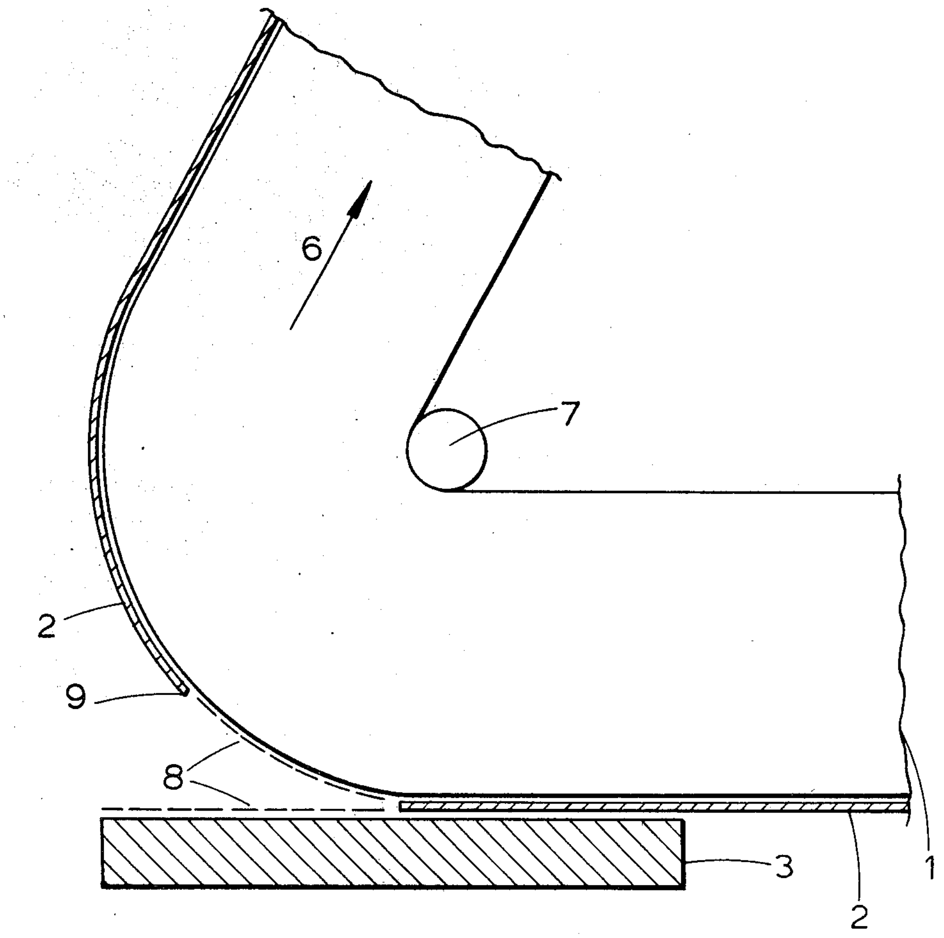
FIG. 5 is a magnified cross-sectional view of a transfer of the kind shown in FIG. 1 which illustrates schematically the mechanism of release of the single transferable design layer (3) by pulling the carrier sheet (1) around a small radius rod (7) using a bending force (6) whereby the transferable layer resists the bending force (6) and transmits sufficient stress to the release layer (2) to cause cohesive failure in a section (8) of the release layer. A portion of this section (8) co-transfers with the transfer layer by lateral shear and a portion remains on the carrier sheet. The release layer shows vertical shear (9) precisely around the edges of the transfer layer. Stress-failure of the release layer could alternatively occur by adhesive failure but this is not illustrated.
Figure 6:
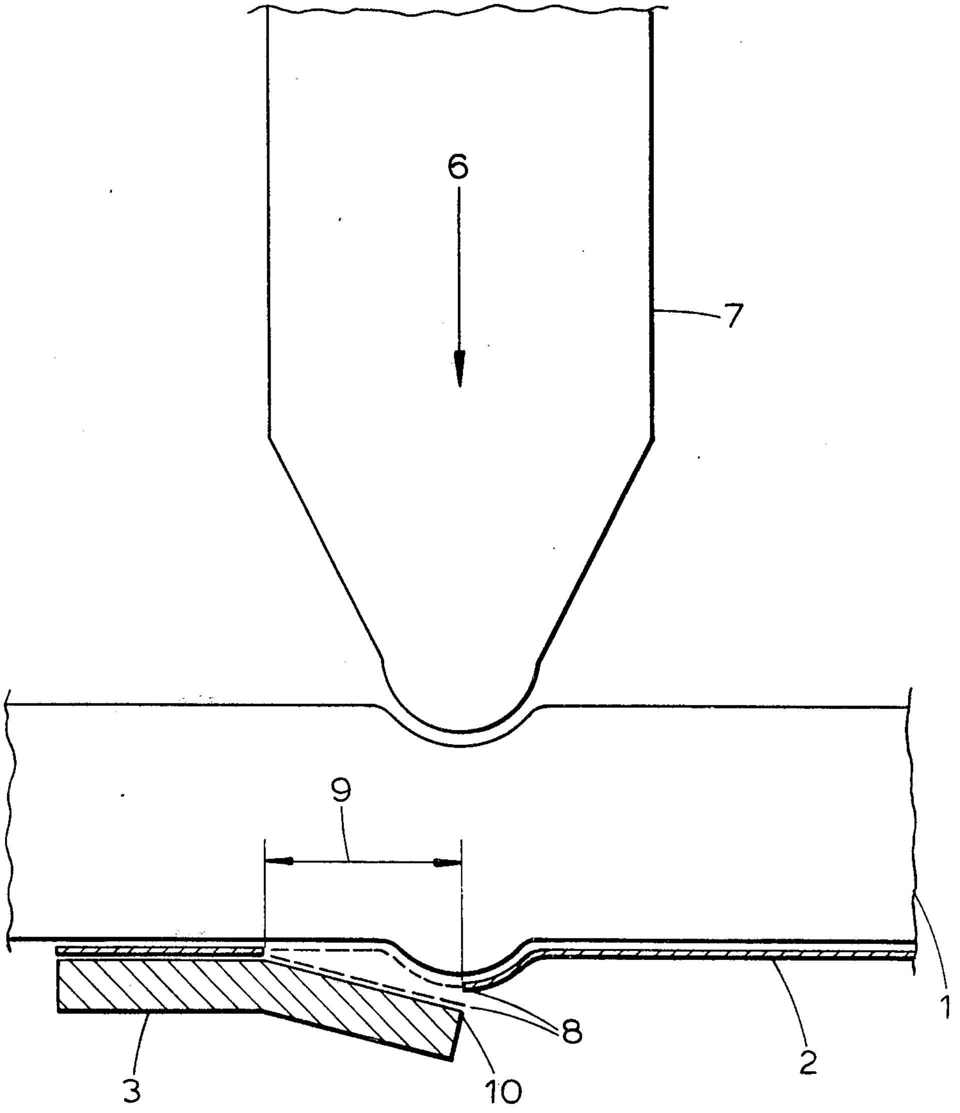
FIG. 6 is a magnified cross-sectional view of a transfer of the kind shown in FIG. 1 which illustrates schematically the mechanism of release of a single transferable design layer (3) by a ball-pen stylus (7) applied with a force (6) to the back of the carrier sheet (1) so causing local deformation of the carrier sheet, which may be elastic (i.e. reversibly deformable) or permanently deformable. The transferable layer is pre-released over a band (9) without assistance of an adhesive layer and this band is much wider than the stylus tip diameter (7). Pre-release is visible by the air film which enters at (9). The illustration shows stress-failure of the release layer by cohesive failure (8) but alternatively adhesive failure or both could occur. A second stroke of the stylus spaced from the first stroke will cause release of the entire transferable layer.

External force can be applied by a number of means such as a series of strokes of high localised pressure on the carrier sheet from a ball-pen, pencil or other stylus and by bending the carrier sheet around a small radius. A direct tensile force, peeling force, shearing or twisting force applied to the carrier sheet will cause stress-failure of the release layer.

In a preferred embodiment of the invention physical release of the transferable layer occurs to such an extent that it is clearly visible as lightening of the colour of the design due to an air film entering between transferable layer and carrier sheet. This is an important aid to reliable transfer which ensures that release is complete and guarantees freedom from fracture of the design. Such visible release is termed herein "pre-release" since it can be produced prior to adhesive bonding, for example without any adhesive layer being in contact with the receiving substrate.

Stress-failure of the release layer by an external force requires that the transferable layer possesses sufficient stress-resisting properties so that the force applied to the carrier sheet is transmitted to the intervening release layer to cause cohesive or adhesive stress-failure or by a combination of these.

The stress-resisting properties of the transferable layer are approximately proportional to its Young's modulus and to the cube of the layer thickness. A sufficiently thick layer of high molecular weight polymers such as cellulose esters and ethers give a suitable stress-resisting layer provided plasticiser concentration is strictly limited. Cross-linking is an excellent means of increasing Young's modulus and acrylic, epoxy, polyurethane, polyamide and aminoformaldehyde polymers are all suitable. The stress-resisting properties of the transferable layer should not be obtained by means of rigidity causing brittleness. The transferable layer should have sufficient elongation at break-point to avoid breaking during transfer and an elongation of over 0.5% and preferably over 5% is desirable.

All the usual types of colour design inks for their respective printing process are suitable when used in conjunction with a stress-resisting transferable layer. Examples are oxidation drying, solvent-based, water-based and photopolymerisable inks.

The colour and clear inks of the transferable layer should not destroy the cohesive or adhesive failure properties of the release layer for example by dissolving the release layer.

In a preferred embodiment of the invention the stress-resisting transferable layer is produced by photopolymerisation of an ethylenically unsaturated ink. This stress-resisting layer may be the colour design layer of a single layer transfer or the clear or coloured overall layer of a multilayer transfer.

Multilayer transfers are preferably produced in which both the colour design layer and the overall layer are produced by such photopolymerisation.

Photopolymerisation of ethylenically unsaturated liquid inks of excellent printability to give strong and flexible transfer layers are also described in our copending U.S. patent application No. 926,077 filed July 19, 1978, now U.S. Pat. No. 4,286,008 and reference may be made to our copending application for further details as to photopolymerisable inks. Design and overall stress-resisting layers produced by photopolymerisation are superior to such layers produced by all other printing inks.

Photopolymerisation is produced by brief exposure to actinic radiation such as ultra violet radiation or a mixture of ultra violet and visible radiation or accelerated electron beam radiation. Ultra violet radiation of high intensity is conveniently produced by medium pressure mercury vapour discharge lamps operated at 80 WATTS per centimeter or more in fused silica or quartz tubes. Other useful sources of intense ultra violet are xenon discharge lamps and xenon flash lamps and swirl flow plasma radiation areas.

A high layer thickness is readily achieved by photopolymerisation because the inks are free from volatile materials or have only a low concentration of these. A layer thickness of at least 5 micrometers is usually required to give effective stress-resisting properties and generally the transferable layer total thickness is in the range 5-50 micrometers and preferably 10-30 micrometers, the high values used for larger designs or designs with finely detailed edges. These ranges of layer thickness are readily produced by screenprinting with suitable selection of the screen mesh but may also be produced by other printing processes, by applying multiple layers. For example four offset litho layers applied at 1.8-2.2 micrometers per impression, preferably with exposure to polymerisation radiation between each impression will produce a layer thickness of 8 micrometers.

Young's modulus of the photopolymerised transferable layer is readily controlled over a wide range of values by means of crosslink density. Crosslink density is mainly determined by the number of photopolymerisable ethylenically unsaturated groups per molecule of the materials used in the liquid ink, termed functionality. One ethylenic group per molecule cannot crosslink and gives a soft and very extensible layer with inadequate Young's modulus. Two ethylenic groups per molecule generally give a suitable value and three ethylenic groups give high values which may lead to spontaneous release. However Young's modulus values depend partly on other chemical composition properties of the materials and the effect of functionality is given here only as a general guide to control of Young's modulus. A mixture of materials with one, two and three ethylenic groups is a useful means of achieving printability and crosslink density which will then be an average value. The mono-ethylenic material can be compared to a plasticiser in conventional inks, the di-ethylenic material provides the main component and the tri-ethylenic material is added to increase the stress-resisting properties to precisely the desired value.

The transferable layer must not be brittle and break during release from the carrier sheet and generally an elongation at breakpoint of over 0.5% is required with preferred values of 2% or higher and an elongation of 15% may be required for complex designs applied to irregular substrates. Elongation properties are achieved by using flexible chemical groups in the photopolymerisable materials such as polyalkyl, polyether and polyester groups, combined with control of the crosslink density.

Another important advantage of photopolymerisation in operation of the invention is that very fast ink "drying" is obtained. Carrier sheets with the release layer have little or no air permeability and the drying of conventional inks which rely partly on substrate absorption is very slow. Photopolymerisation does not rely on absorption drying and extremely fast drying rates are achieved provided materials are selected which exhibit such fast photopolymerisation. It is very desirable to use fast photopolymerising material in order to reduce the exposure time to the actinic radiation since the radiation frequently has an infra red component which causes heating of the carrier sheet which can cause distortion or shrinkage with excessive exposure.

Very fast photopolymerising inks are obtained by photoinitiated vinyl addition polymerisation of monomers and prepolymers containing terminal or pendant acryloyl or methacryloyl groups: $CH_2{=}CR{-}CO{-}$ where R is H or $CH_3{-}$ respectively. The acryloyl group is faster polymerising than the methacryloyl group and reference below to acryloyl groups includes methacryloyl groups.

To obtain excellent printability the liquid ink must possess correct viscosity and tack values and these can be readily achieved together with all the other requirements described above by controlling the molecular weight and composition of the photopolymerisable materials. Conveniently a material of high viscosity is used in admixture with a liquid of lower viscosity.

Low viscosity and liquid photopolymerisable materials are monomers, that is materials which do not contain polymeric groups in the molecule and suitable materials are acrylate esters of mono,di,tri and tetrahydric alcohols. Monomers are preferred which have very low volatility and low skin and eye irritancy and these properties are generally obtained with monomers of higher molecular weight. Acrylate esters of the following alcohols are suitable and are given by way of example:

Monohydric alcohols: 2 phenoxyethanol, 2 phenoxyethoxyethanol and hydrogenated derivatives
dihydric alcohols: tripropylene glycol, bisphenol A, hydrogenated bisphenol A and hydroxethyl ethers and hydroxypolyethoxyethers of bisphenol A and hydrogenated bisphenol A.
Trihydric alcohols: trimethylolpropane
tetrahydric alcohols: pentaerythritol
Polyhydric alcohol: dipentaerythritol All hydroxyl groups may be esterfied or one or more groups may be left unesterfied to provide materials with controlled hydrophilic—lyophilic balance for offset litho inks. Free hydroxyl groups may be reacted with isocyanates to produce urethanes.

High viscosity is readily obtained by photopolymerisable prepolymers in which there is a polymeric component in the molecule. These materials range from highly viscous liquids to solids and have molecular weight range of about 250-5000. The terminal or pendant acryloyl groups can be incorporated in polymeric components such as a polyurethane, polyepoxide, polyether, polyester and polyaminoformaldehyde polymers.

Preferably 2-6 acryloyl groups are incorporated in the polymer molecule and this can be carried out for example by reacting acrylic acid or acryloyl chloride with a polymer or polymerisable material containing free hydroxyl groups. Alternatively such groups can be incorporated by reaction of a hydroxylalkyl acrylate with a polymer or polymerisable material containing isocyanate, epoxide, carboxylic acid, anhydride or aminoformaldehyde groups.

For example an acrylated epoxy prepolymer is prepared by reacting bisphenol A polyglycidyl ether having terminal epoxide groups with acrylic acid which open the oxirane ring and the hydroxyl groups so produced can be further reacted with acryloyl chloride to introduce additional acryloyl groups.

Acrylated urethane prepolymers are prepared for example by reacting hydroxypropyl acrylate with hexamethylene di-isocyanate or polyisocyanates. Alternatively acryloyl polyether urethanes and acryloyl polyester urethanes are prepared by reacting an excess of a di- or polyisocyanate with a polyether or polyester having free hydroxyl groups and then reacting this polymer with a hydroxyalkyl acrylate.

To obtain the correct balance of properties more than one monomer and more than one prepolymer may be used in the inks. One or more photoinitiators are dissolved or dispersed in the unsaturated materials at a concentration of 0.01–30% and more usually 1–10%, based on the weight of unsaturated material, to photoinitiate polymerisation when using ultra violet radiation or ultra violet plus visible radiation. Photoinitiators are not required when high energy accelerated electron beam radiation is used. The following are examples of photoinitiators:

Ketones and derivatives such as benzophenone, 4,4 dimethyl-aminobenzophenone, acetophenone, 2.2diethoxyacetophone, halogenated benzophenone, benzil, benzil dimethyl acetal. Acryloin and derivatives such as benzoin benzil dimethylacetate and benzoin isopropyl ether. Thio compounds such as thioxanthone, 2 chlorothioxanthane, benzoyl diphenyl sulphide, polynuclear quinones and derivatives such as benzoquinone, chloroanthraquinone. Chlorinated hydrocarbons such as hexachlorethane and diazo compounds including fluoroborate salt of diazonium compounds.

The effect of photoinitiators may be accelerated by a tertiary amine such as ethyl dimethylaminobenzoate or amino acrylate polymer.

Other types of unsaturated monomers and prepolymers can be added to the main photopolymerisable materials listed above to participate in the photopolymerisation such as N-vinylpyrolidone, vinyl acetate, allyl and cinnamyl esters, acrylamide derivatives such as (n-isobutoxymethyl) acrylamide, triallylcyanurate. Unsaturated polyesters includes maleate, fumarate, itaconate and citraconate esters of glycols.

Non-reactive polymers can also be dissolved or dispersed in the main photopolymerisable materials such as a high acid value polyester to give alkali solubility to the photopolymerised transferable layer, or dispersed finely powdered polyvinylchloride or vinyl chloride-acetate copolymer which solvate during photopolymerisation to increase film strength and flexibility.

Finally various other additives may be added to the inks such as pigments, fillers, flow agents, waxes which are well known to persons skilled in the art of printing inks.

Photopolymerisation can be subject to inhibition by atmospheric oxygen which mainly affects the outer surface of the transferable layer. This can lead to a reduction in film strength with thin transferable layers but oxygen inhibition can be prevented according to the invention by very high intensity focussed radiation using an elliptical reflector and by the use of poly-acryloyl unsaturated materials in conjunction with the most efficient photoinitiators and accelerators. If necessary, photopolymerisation may also be carried out in a nitrogen atmosphere or by placing a transparent plastic film over the liquid ink during exposure, both of which reduce access by atmospheric oxygen.

Polyester carrier sheets readily transmit long wavelength ultra violet radiation such as 365 nm and polyethylene carrier sheets readily transmit also the short wavelengths of 254 and 310 nm. Consequently photopolymerisation can be carried out by reverse exposure, that is by passing the radiation through the carrier sheet. This has the advantage that the most highly polymerised layer will then be adjacent to the release layer where the effect of a high Young's modulus is most pronounced. When using inks with a high optical density such as a black ink with a density of 1.5 or more it is useful to use both reverse and direct exposure simultaneously or successively.

In an embodiment of the invention, oxygen inhibition of the transferable layer is deliberately arranged by selection of suitable acryloyl unsaturated materials, photoinitiators and control of radiation intensity to reduce the rate of photoinitiation to cause adhesiveness and tackiness in the outer surface of the photopolymerised transferable layer by formation of soft or tacky low molecular weight polymer species. By this means an extra adhesive layer is avoided and of course this 'self adhesive' surface is in perfect register with the transferable layer.

Such surface adhesiveness is particularly easily achieved by reverse exposure, that is by passing ultra violet light through the carrier sheet and release layer rather than by the normal direct exposure. The adhesiveness of a self-adhesive layer is increased when the outer surface is produced so as to have a high gloss since this increases the contact area to receiving substrates.

Such self-adhesive transfers are particularly useful where an easily removable adhesive bond is required such as letter and symbol sheets for graphic artists and for home decor of walls and furniture.

Photopolymerised ink layers when pre-released from the carrier sheet can be of sufficient stiffness to be handled and used like a piece of plastic film or label. The transfer can be transferred to a substrate and moved about on its surface into an exact position and later the transfer can be adhered or removed and reused if required.

The release layer in addition to providing a layer with closely controlled cohesive and adhesive properties also serves a number of other very valuable functions including reliable and high speed sheet feeding without static problems on printing presses, printing by all processes including lithography, letterpress, gravure, flexographic, xerography, ink jet and screenprinting together with all drawing and painting and other imaging processes, excellent printability particularly high density solids and fine halftone printing and printing with very detail high resolution, freedom from ink-picking and fast ink drying.

Ink picking in multicolour printing can be avoided by using colour layers which are not stress-resisting. For example colour printing by four colour halftone litho will give very thin colour layers of low Young's Modulus and these will unite with the clear layer to form a composite layer which can be physically released including pre-release but only where the colour layer is covered with the clear layer.

As mentioned above, the thin release layers used in this invention are distinguished from the high release coating, e.g. silicones or Werner chromium complexes, applied to sheet materials in prior proposals in order to increase surface release properties. Such high release coatings are bonded to the carrier sheet and remain on the carrier sheet after transfer.

High release coatings have even worse printability and ink-pick than inherently high release carrier sheets, such as polyethylene, and moreover any adhesive layer which overlaps the transferable layer will also be transferred and contaminate the receiving surface with a sticky layer outside the design.

The thickness of the release layer should be substantially less than the transferable layer to give easy vertical shear around the edges of the transferable layer. A thickness ratio of 1:3 or less is required and even a ratio of 1:100 or less is required depending on the film strength of the release layer compared with that of the transferable layer material. Generally a release layer thickness of 0.1–1.0 micrometers is readily applied and is used with a transferable layer of 5–50 micrometers total thickness.

A release layer with the higher thickness values is used when it is required to impart special properties to the transferable layer after transfer such as abrasion resistance, weather resistance and colour and other properties.

Cohesive-failure of the release layer requires a material of low tensile strength and this requirement is met by materials such as waxes, soaps, surfactants and low molecular weight polymers and mixtures thereof having low tensile strength properties. These generally are all materials having a substantial proportion of low polarity material giving low intramolecular forces.

Physical or chemical pre-stressing of the release layer is a valuable additional feature of the invention which reduces the external force required to cause final physical release of the transferable layer. Prestressing of the release layer by the transferable layer will only occur in the release layer where this is covered by the transferable layer. The excess release layer outside this region can therefore adhere strongly to the carrier sheet and this assists shear by retention of the excess layer on the carrier sheet.

Similarly pre-stressing cannot occur until the stress-resisting transferable layer is applied so that this avoids ink-picking in multicolour printing.

Physical pre-stressing is produced by lateral shrinkage of the transferable layer during the formation of the transfer layer whether by evaporation of a volatile component, cross-linking or photopolymerisation. Pre-stressing can occur to such an extent that the transferable layer will physically release without any applied external force and this is normally avoided unless transfers are required so released from the carrier sheet.

Adhesive-failure of the release layer is generally obtained when the release layer is based as a polymer which has been physically, chemically or thermally stressed.

Chemical pre-stressing is obtained by inter-action of a liquid component of the transferable layer (or of an adhesive layer) on the release layer. The interaction normally causes swelling of the release layer and the swollen material is of much lower tensile strength and readily shows cohesive failure. The process of swelling also causes stressing of the adhesive bonds of the release layer to the carrier sheet and can lead to a permanent reduction of adhesion even if the liquid component is volatile and eventually evaporates.

Thermal pre-stressing of a release layer is produced by raising the temperature to the softening point of a thermoplastic release layer such as a wax, thermoplastic polymer or mixture thereof. This can lead to a permanent reduction of adhesion and it can also cause cohesive-failure since the action of any liquid swelling component is intensified at elevated temperatures. Heat is conveniently applied during the drying or curing of the transferable layer.

The release layer can be applied to the carrier sheet by all coating methods. These include application in the liquid state for example by spray, roller, airknife and printing methods. The release layer composition can be converted to such a liquid state by solution or dispersion in a volatile liquid or by hot melt. The release layer can also be applied in the vapour phase at atmospheric or reduced pressure when using materials which can be vapourised.

Plastic sheets produced by extrusion or calendering can have a release layer composition of limited compatibility incorporated in the plastic before sheet formation so that this separates out on the surface of the sheet after sheet formation. A similar method is used to extrusion coat a plastic layer on another substrate such as a paper sheet. The liquid release layer composition can also be used to impregnate an absorbent material such as a paper carrier sheet so that a layer of the release layer composition is left on the surface of the substrate after conversion to the solid state.

The release layer is generally light-transmitting and non-coloured but a coloured layer can be used for special applications. For example a release layer can consist of vacuum deposited aluminium of about 0.1 micrometers thickness on a polyester plastic sheet so that after transfer in which the release layer shows adhesive-failure the transferable layer will have a brilliant metallised finish.

The releasable layer of the present invention provides a major increase in printability compared with the plastic surface to which it is applied. Plastics and transparentised cellulosic materials are well known to have very poor printability compared with normal printing papers particularly when printed by lithography and this is evident as weak and non-uniform print solids and repellency spots in fine line detail and half-tones. This poor printability is a result of low and uneven wet ink transfer due to zero absorbency of the substrate and to poor wetting of the plastic by the ink.

The thickness of the release layer is determined by the requirement to physically shear during transfer and also to provide a continuous printable layer on the carrier sheet. In practice an extremely thin releasable layer is found to be most suitable. The lower thickness values in the range of 0.05 to 2 $\mu$m are generally employed except in special applications where it is required that the releasable layer transferred with the design should impart certain functional properties to the design, such as abrasion, heat or weather resistance. In these special cases significantly thicker releasable layers may be used.

Application of the releasable layer as a continuous film is readily achieved at high speed by coating methods such as roller, reverse-roll, Mayer bar, air-knife and gravure coating methods. Although a releasable layer is necessary on only one side of the sheet, it may be applied to both sides simultaneously, as a roller coating, so that either side of the sheet may be used for printing.

Alternatively, the releasable layer can be applied in discrete areas, larger than the intended design area by printing or panel varnishing methods.

The releasable layer is generally applied as a solution or dispersion in a volatile liquid, followed by removal of the liquid by evaporation. A wet coating weight of 3 mls/m$^2$ with a 4% solids composition will yield a dry weight of 0.1 mls/$m^2$ which is equivalent to 0.1 mm thick. A dry thickness of this order is practically invisible.

The release layer is conveniently applied as a solution or dispersion of a polymer or wax or a mixture thereof in a volatile liquid followed by removal of the liquid by evaporation. For high print quality of the design layers, the releasable layer surface should have a fine matt finish which is obtained by incorporating a fine particle size matting agent in the polymer solution such as aerogel silica. A wax solution or dispersion may be used without matting agent since a natural matt finish is usually obtained. Similarly a wax incorporated in a polymer solution may also provide a natural matt finish. A matt finish is also obtained by using a mixture of polymers solutions or dispersions which are incompatible when dry. The conditions for physical shear are an ultra thin layer, as described, and very low cohesion obtained from the dispersed or incompatible components of a partially coalesced layer derived from a dispersion of a wax or aqueous or non-aqueous polymer dispersion.

Ink wettability is derived partly from the matt surface and additionally by selecting materials for the releasable layer having similar polarity to the design ink. It is possible to select a releasable layer having universal wettability such as a mixture of hydrocarbon groups with amide, ether or hydroxyl groups, such as stearic acid, and octadecanamide. Polyethylene wax is suitable for oil based inks.

The releasable layer should resist handling and picking and also be non-blocking. The releasable layer should also retain its substrate release properties when overprinted with the design layer. In general this necessitates a releasable layer which has a softening point above 50° C. and which is not freely soluble in the solvents of the design layer and is resistant to any plasticiser in the design layer.

A very wide variety of carrier sheets can be used in the invention including those which have not been previously usable because carrier sheets of the invention are free from the prior stringent and conflicting requirements of high release properties, printability, feeding and non ink-picking. Carrier sheets can be selected from plastic films and cellulosic materials and combinations of these.

Plastic films include polyethylene, polypropylene, polystyrene, polystyrene-butadiene, polyvinyl chloride, polyvinylacetate, polyesters and cellulose acetate.

Cellulosic materials include glassine, greaseproof and vegetable parchment papers in which the porosity of the cellulosic material has been reduced or eliminated. Cellulosic materials which have been coated, extrusion coated, laminated or impregnated with a plastic or polymer are also suitable.

Light transmitting carrier sheets are generally preferred to assist in positioning the transfer on the receiving substrate.

When plastic carrier sheets are used alone these develop very high electrostatic potential preventing feeding on the printing machine. Typically a surface charge of 10,000 volts is developed simply by rubbing the sheets together and will be retained indefinitely.

This difficulty is overcome in the present invention by incorporation of an anti-static agent in the release coating. Suitable anti-static agents are quaternary ammonium compounds and polyoxyethylene derivatives. The electrostatic voltage of a rubbed sheet will be reduced to only about 1,000 volts which has no adverse effect and this charge will fairly rapidly fall to zero.

In a preferred embodiment, the design is formed by printing one or more inks onto the releasable layer and coating or printing a stress-resisting layer over the ink layer or layers so as to form a multilayer transferable design. In such a case the ink layers may contribute little or nothing to stress-resisting properties of the multicomponent design layer.

The stressing action of the design layer has the effect of causing shearing of the releasable layer around the perimeter of the design layer and thereby facilitating release of the design on transfer. Alternatively or additionally the design layer may contain a solvent which interacts with the releasable layer, particularly around the periphery of the design to cause weakening of the bond between the releasable layer and the carrier sheet. Generally to avoid the need for precision register of stress-resisting and colour layers, the stress-resisting layer is printed so as to slightly overlap all round the colour layer. Typically the stress-resisting layer is a clear transparent layer having significant film strength. However it may be pigmented white or other colour and act as a backing layer for the design and be sufficiently opaque to mask the colour of the receiving substrate so as to increase the contrast of the transfer with respect to the substrate.

In the case of multicolour designs, the stress-resisting layer normally serves the dual function of uniting the individual design layers and providing the film strength necessary to enable the complete design to be transferred without distortion or breakage, as well as causing shearing and release of the releasable layer.

The film strength of the stress-resisting layer is achieved by using a polymer composition applied at sufficient layer thickness. A thickness of at least 3 $\mu m$ is desirable and strong films are obtained at 6 $\mu m$ and film strength continues to increase up to 30 $\mu m$ and over. The thinner films of 3–6 $\mu m$ are readily obtained with solvent-based inks where sufficient wet ink thickness can be applied so as to provide the above dry film thickness values taking into account the volume concentration of non-volatile material in the liquid ink which is usually about 40%. The entire dry thickness range, depending only on the limitations of the printing processes used, is obtained by using inks without volatile continuents or only a minor proportion of these and the most convenient of these inks are those which dry by photopolymerisation as described in our above-mentioned patent application Ser. No. 926,077.

The inclusion of a solvent in the stress-resisting layer in which the polymer or wax of the releasable layer will swell results in reduction of adhesion of the releasable layer to the support. Reduction of adhesion of the releasable layer is determined by applying an adhesive tape test before and after applying the design layer to the releasable layer. Peel bond adhesion will be reduced and may be less than 200 gm/cm and may be as low as 0.5 gm/cm. The degree of adhesion reduction required is dependent on the tack of the adhesive and a low tack adhesive will require a very low value of reduced release layer adhesion of 0.5–5 gms/cm whereas a high tack pressure sensitive adhesive will cause transfer with a releasable layer adhesion of 100 gm/cm. In fact it is disadvantageous to have a very low reduced releasable layer adhesion with a high tack adhesive because such adhesives must be protected with a silicone coated protective paper in storage and removal of such paper applies a peel bond of several grams per centimeter and this would cause unwanted transfer onto the protective paper if the reduced layer adhesion were too low. The ability of the releasable layer to release from the support sheet requires that the releasable layer should be substantially incompatible with the polymer of the substrate layer and the releasable layer composition should not be applied in solvents having a strong solvent action on the support sheet.

A pressure-sensitive adhesive layer may be applied over the design and shear layers, either in register therewith or in an overlapping manner.

The adhesive may be a pressure sensitive adhesive of low or high tack. A low tack adhesive is not responsive to light pressure such as finger pressure so that a multiplicity of designs can be carried on the support sheet and a single design selected from these and moved into an exact location on the receiving substrate and transferred by the localised application of high pressure for example by stylus action or use of a pencil or ball-point pen over the selected design without accidental transfer of adjacent designs.

A high tack pressure sensitive is used when a very strong or permanent bond is required to the receiving substrate and in this case it is usually necessary for the support sheet to bear a single design.

The pressure sensitive adhesive layer is based on tacky polymers or on elastomers that can be tackified by resins. Examples of tacky polymers are polyvinyl ethers, polyisobutylene, silicones and acrylic homopolymers. Examples of a tackified elastomer is natural rubber tackified with hydrocarbon resin. The tack of these adhesives can be reduced for low tack applications by reduction of the adhesive layer thickness and addition of waxes and finely powdered materials such as finely powdered silica.

The adhesive may be prepared and applied to the design layer as described in British Pat. No. 1,491,678.

Moreover, the overlap part of any adhesive layer can dissolve or disperse the very thin releasable layer during the application of the adhesive and so allow the adhesive layer to contact the carrier sheet and adhere thereto and so further prevent contamination. Yet another mechanism available in this invention is that the release layer can deactivate the adhesive layer for example by a surface active agent in the release layer diffusing to the surface of the overlap adhesive layer. For example a quaternary ammonium salt containing a long alkyl chain which is surface active will reduce or eliminate the tack of the adhesive in the overlap adhesive region and can also weaken the adhesive layer that it will shear more readily and precisely around the transferable layer edges.

EXAMPLES

The following Examples in which all parts are by weight unless stated to the contrary are given to illustrate the invention and the manner in which it may be carried into effect:

EXAMPLE 1

A flat die extruded carrier film of polystyrenebutadiene of low butadiene content of 120 micrometer thickness and a semi-matt surface is coated on both sides by a roller coating with the following release layer composition in which quantities are parts by weight:

| | |
|---|---|
| Octadecanamide mpt 102–104° C. | 5.00 |
| Aliphatic hydrocarbon (b.pt. 150–170° C.) | 95.00 |
| | 100.00 |

The octadecanamide wax is dissolved in 30% of the solvent by heating and the remainder of the cold solvent is poured into the hot solution with high speed stirring to give a very fine collodial dispersion of the wax in solvent. A wet coating weight of 4 mls/m$^2$ is applied to each side of the sheet to give a calculated dry thickness of 0.2 μm after the coating is dried by warm air jets at 70° C.

A fine semi-matt surface finish is obtained which can be sheared vertically and laterally by applying a piece of adhesive tape and peeling this off carrying with it a layer of the release layer. About 50% of the layer thickness is removed with the tape as can be shown by colouring the release layer.

The carrier sheets with this release layer were printed with four colour halftone design layers by offset litho using a design consisting of a set of 10 different small pictures and one hundred such sets were printed on each sheet using the following litho links giving excellent print quality including high density solids with freedom from picking.

| Yellow | |
|---|---|
| Colour Index Pigment Yellow 13 | 14 |
| Long oil linseed alkyd | 35 |
| Phenolic modified wood oil alkyd | 35 |
| Distillate b.pt. 225–266° C. | 13.5 |
| 12% cobalt octoate (drier) | 1 |
| 10% manganese siccatol (drier) | 1 |
| Methyl ethyl ketoxime (antioxidant) | 0.5 |
| | 100.0 |

The yellow pigment was dispersed in the long oil linseed alkyd on an hydraulic triple roll mill to a value of 6 on a Hegman gauge. The ink was finally thinned with 15–20% of distillate to give an ink viscosity of 15 poises.

Magenta

This was prepared similarly by replacing the yellow pigment with 18 parts of Colour Index Pigment Red 57.

Cyan

This was prepared with 16 parts of Colour Index Pigment Blue 15.

Black

Carbon black 18 parts, toned with one part of Colour Index Pigment Blue 15 was used.

When printing on a single colour press each colour is dried overnight before applying the next colour. On a multicolour press all four colours are applied wet on wet and the inks are tack-graded to facilitate this.

The following clear transferable layer of high Young's Modulus was printed over the colour designs so as to slightly overlap these all round by screenprinting using a mesh of monofilament polyester with 77 mesh/cm and 37 micrometer filament diameter to provide a dry film thickness of 8 micrometers:

| | |
|---|---|
| Cellulose nitrate (high nitrogen low viscosity) | 25 |

-continued

| | |
|---|---|
| Di-n-butyl phthalate | 4 |
| Linear liquid polyester | 8 |
| 2-Isopropoxyethanol | 63 |
| | 100 |

The layer was dried by evaporation on a hot air drier at 70° C. for 60 seconds. The clear layer had stress-resisting properties due to the high molecular weight polymer and restricted plasticiser concentration (48 parts per 100 parts of polymer) and because of the substantial thickness of the layer. Lateral shrinkage occurred on drying to physically pre-stress the release layer so that strokes of a ball pen stylus applied with a force of 150 grams caused physical pre-release as shown by lightening of colour and the released designs could be picked off the sheet and placed on any receiving surface. The release layer sheared vertically precisely round the clear layer and sheared laterally under the clear layer so that a section remained on the carrier sheet and a section co-transferred with the transferable layer.

EXAMPLE 2

A release layer consisting of a 10% colloidal dispersion of microcystalline wax in aliphatic hydrocarbon was applied at a coating weight of 5.5 mls/m$^2$ to polystyrenebutadiene carrier sheets as used in Example 1 and dried by evaporation with hot air jets at 70° C. to give a dry coating weight of 0.2 g./m$^2$.

The carrier sheets were printed at 6000 sheets per hour with colour designs by offset litho on a four colour press using the following process inks which were cured at the delivery of the printing machine by photoinitiated polymerisation by exposure to ultra violet radiation from two medium pressure mercury vapour arcs in quartz tubes so that deep stacking of the sheets was possible without set-off.

| Yellow | |
|---|---|
| Colour Index Pigment Yellow 13 | 15 |
| Acrylated epoxy prepolymer | 20 |
| Pentaerythritol triacrylate phenyl carbamate monomer | 60 |
| Benzil dimethyl acetal | 3.5 |
| 2,2-Diethoxyacetophenone | 1.5 |
| | 100 |

The yellow pigment is dispersed in the mixture of the ethylenically unsaturated material on a triple roll mill and the photoinitiators are added as a dispersion in the remainder of the material in subdued light.

Magenta

This was prepared similarly replacing the yellow pigment with 18 parts of Colour Index Pigment Red 57.

Cyan

This was prepared with 16 parts of Colour Index Pigment Blue 15.

Black

This was prepared with 18 parts of Carbon black and 1 part of Colour Index Pigment Blue 15.

The colour designs were overprinted by screenprinting using the following clear photopolymerisable screen ink which was cured by exposure to ultra violet radiation from two tubular medium pressure mercury vapour lamps operated at 80 watts per centimeter to give a crosslinked layer of high Young's Modulus and an elongation at breakpoint of 2.5%.

| | |
|---|---|
| Acrylated urethane polyester prepolymer | 52 |
| 2-Phenoxyethyl acrylate | 26 |
| Tripropylene glycol diacrylate | 15 |
| Benzophenone | 4 |
| Benzil dimethylacetal | 3 |
| | 100 |

2-Phenoxylethyl acrylate is a mono-acrylate ester monomer which can be replaced by the less volatile monophenoxyethyl acrylate ester of bisphenol A or hydrogenated bisphenol A. These materials do not crosslink and increase the flexibility of the layer. Tripropylene glycol diacrylate is a di-acrylate ester monomer which can be replaced by the di-(phenoxy ethylacrylate) ester of bisphenol A or hydrogenated bisphenol A. These materials crosslink and increase Young's Modulus. A small proportion of triacrylated monomer such as trimethylol propane triacrylate can be added to further increase crosslink density and Young's modulus. The acrylated urethane prepolymer is derived from hexamethylene diisocyanate and hydroxypropyl acrylate and contains three acrylate groups per molecule.

The clear photopolymerisable ink was applied by screenprinting using 100 mesh/cm monofilament polyester to give a layer thickness of 19–22 micrometers. Application of stylus pressure by strokes of a ball-pen using a force of only 100 grams caused physical release in bands 3 mm wide so that relatively widely spaced strokes 3 mm apart caused visible release of the entire transferable layer.

EXAMPLE 3

The following release layer composition containing an anti-static agent was coated onto the following carrier sheets and dried using the technique described in Example 1:

| | |
|---|---|
| Microcrystalline wax (m.p. 71–74° C.) | 5 |
| Octadecytrimethylammonium chloride (quaternary ammonium salt) | .7 |
| Aliphatic hydrocarbon | 70 |
| 2-Ethoxyethanol | 24.3 |
| | 100 |

The following carrier sheets were used:

Glassine paper: highly beaten transparent paper of 60 gsm (grams per sq. meter)

Vegetable parchment: sulphuric acid treated paper of 54 gsm

Greaseproof paper: highly beaten semi-transparent paper of 52 gsm

Tracing paper: bleached rag paper impregnated with a solution of butylated melamine formaldehyde which was dried and cross-linked by heating to give a total weight of 70 gsm.

Polystyrene-butadiene (Semi-matt)

High density polyethylene (Semi-matt)

The resulting coated carrier sheets were printed with four colour half-tone designs by offset litho using the litho inks described in Example 1.

After the litho inks had dried overnight, the colour designs were overprinted by screenprinting, using the following clear photopolymerisable screen ink, as described in Example 2. Curing was achieved by exposure to ultra-violet radiation from two tubular medium pressure mercury vapour lamps operated at 80 watts per centimeter to give a cross-linked layer of high Young's Modulus.

| | |
|---|---|
| Acrylated urethane polyester prepolymer | 40 |
| Di-acrylate ester of di-hydroxyethylester of bisphenol A | 36 |
| Monoacrylate ester of mono-hydroxyethyl ester of bisphenol A | 8 |
| Benzophenone | 4 |
| Benxyl dimethyl ketal | 4 |

The resulting transfer sheets all exhibited pre-release of the printed designs by lightly rubbing on the back of the carrier sheet with a ball point pen. Failure of the release layer was indicated by lightening of the image of the design as seen through the back of the transparent or transluscent carrier sheet.

EXAMPLE 4

The printed transfer sheets obtained in Example 2 were overprinted with the following low tack pressure sensitive adhesive so as to overlap the clear transfer layer by 5 mm all round:

| | |
|---|---|
| Polyvinyl ethyl ether | 14 |
| Aliphatic hydrocarbon b.pt 150–180° C. | 62 |
| 2-Propanol | 12 |
| Finely powdered silica | 5 |

The adhesive was printed with a 120 mesh/cm monofilament mesh and dried at 70° C. for 35 seconds. Application of an external force of 100 grams to the carrier sheet by the strokes of a ball-pen spaced 2–3 mm apart while the sheet was in contact with a receiving substrate such as a paper substrate caused lightening of the design and when the carrier sheet was lifted away the entire design was transferred and the release layer and adhesive layer had sheared cleanly around the edges of the clear transfer layer.

EXAMPLE 5

The quaternary ammonium anti-static agent in the release layer composition of Example 3 was increased to 2.5% of the releasable layer composition and applied to the carrier sheet of Example 1 followed by the colour printing and clear layer of Example 2 and the adhesive layer of Example 4. During heat drying the overlap area of the adhesive layer became white and semi-opaque in colour due to de-activation and had reduced tack in the overlap region.

We claim:

1. A dry release transfer sheet which comprises a carrier sheet, a releasable layer adhered thereto and a stress-resisting transferable design layer printed on said releasable layer, said releasable layer having low cohesive strength and low tensile strength compared with the transferable layer and providing a surface capable of being wetted with an ink in printing said design layer and said design layer having an elongation at break which is at least 0.5% and a thickness which is at least 3 times the thickness of the releasable layer, whereby application of an external force to the carrier sheet in the region of the design layer causes stressing of the releasable layer and cohesive failure within the releasable layer thus physically releasing the design layer from the carrier sheet and enabling subsequent transfer of the design layer with an underlying portion of releasable layer.

2. A transfer sheet according to claim 1 in which the transferable design layer has a Young's Modulus which is substantially greater than that of the releasable layer.

3. A transfer sheet according to claim 1 in which the transferable design layer is a multi-layer film comprising at least one coloured ink and a clear or coloured layer of substantial film strength, the latter layer providing the major stress-resisting properties of the transferable design layer.

4. A transfer sheet according to claim 1 which includes an adhesive layer superposed on said transferable design layer, either in register therewith or overlapping onto the releasable layer.

5. A transfer sheet according to claim 1 in which the transferable design layer is 5 to 50 $\mu m$ thick.

6. A transfer sheet according to claim 1 in which the releasable layer is 0.1 to 1 $\mu m$ thick.

7. A transfer sheet according to claim 6 in which the releasable layer comprises a material having low cohesive strength selected from waxes, soaps, surfactants, and low molecular weight polymers having low tensile strength and mixtures thereof.

8. A transfer sheet according to claim 1 in which the transferable design layer comprises a photopolymerised ink film.

9. A transfer sheet according to claim 8 in which the photopolymerised ink film is produced by photopolymerisation of an ethylenically unsaturated monomer or prepolymer composition containing a photoinitiator.

10. A transfer sheet according to claim 9 in which the unsaturated monomer or prepolymer contains acryloyl or methacryloyl groups.

11. A transfer sheet according to claim 10 in which the monomer or prepolymer is capable of cross-linking on photpolymerisation.

12. A transfer sheet according to claim 10 in which the prepolymer is an acrylated or methacrylated urethane prepolymer.

13. A transfer sheet according to claim 12 in which the urethane prepolymer contains 2 to 6 acryloyl groups per molecule.

14. A dry release transfer sheet which comprises a carrier sheet, a releasable layer adhered thereto and a stress-resisting transferable design layer printed on said releasable layer, said releasable layer having low cohesive strength and low tensile strength compared with the transferable layer and providing a surface capable of being wetted with an ink in printing said design layer and said design layer comprising a cross-linked photopolymerised ink film having an elongation at break which is at least 0.5% and a thickness which is at least 3 times the thickness of the releasable layer, whereby application of an external force to the carrier sheet in the region of the design layer causes stressing of the releasable layer and cohesive failure within the releasable layer thus physically releasing the design layer from the carrier sheet and enabling subsequent transfer of the design layer with the whole or part of its underlying portion of releasable layer.

15. A dry release transfer which comprises a carrier sheet, a thin releasable layer adhered thereto and a stress-resisting transferable design layer printed on said releasable layer, said transferable design layer having an elongation at break which is at least 0.5% and a thickness which is at least 3 times the thickness of the releasable layer, said releasable layer comprising a wax containing composition and having low cohesive strength and low tensile strength compared with the transferable layer, whereby application of an external force to the carrier sheet in the region of the design layer causes weakening or rupture of the adhesive bond between the design layer and the carrier sheet accompanied by partial or complete cohesive failure within the releasable layer thus physically releasing the design layer from the carrier sheet and enabling subsequent transfer of the design layer with an underlying portion of the releasable layer.

16. A transfer sheet according to claim 15 in which the releasable layer is chemically pre-stressed by interaction with a liquid component of the transferable layer or of a superposed adhesive layer.

17. A transfer sheet according to claim 15, in which the design layer is physically prestressed by shrinkage of the transferable design layer.

18. A transfer sheet according to claim 17 in which shrinkage of the design layer arises by evaporation of a solvent or polymerisation.

19. A transfer sheet according to claim 15 in which the design layer is a photopolymerised ink composition.

20. A transfer sheet according to claim 19 in which the design layer is cross-linked polymerised ink.

21. A transfer sheet according to claim 15 in which the releasable layer includes an anti-static agent.

22. A transfer sheet according to claim 21 in which the anti-static agent is selected from quaternary ammonium compounds and polyoxyethylene derivatives.

* * * * *